United States Patent
Hochhalter

(10) Patent No.: US 11,462,882 B2
(45) Date of Patent: *Oct. 4, 2022

(54) DISTRIBUTED RAMAN AMPLIFIER SYSTEMS

(71) Applicant: Mox Networks, LLC, Culver City, CA (US)

(72) Inventor: David Hochhalter, Annandale, VA (US)

(73) Assignee: MOX NETWORKS, LLC, Culver City, CA (US)

( * ) Notice: Subject to any disclaimer, the term of this patent is extended or adjusted under 35 U.S.C. 154(b) by 409 days.

This patent is subject to a terminal disclaimer.

(21) Appl. No.: 16/657,115

(22) Filed: Oct. 18, 2019

(65) Prior Publication Data

US 2020/0052457 A1 Feb. 13, 2020

Related U.S. Application Data

(63) Continuation of application No. 15/581,342, filed on Apr. 28, 2017, now Pat. No. 10,468,850, which is a
(Continued)

(51) Int. Cl.
*H01S 3/131* (2006.01)
*H01S 3/30* (2006.01)
(Continued)

(52) U.S. Cl.
CPC .......... *H01S 3/1312* (2013.01); *G02B 6/4286* (2013.01); *H01S 3/0014* (2013.01);
(Continued)

(58) Field of Classification Search
CPC .. H01S 3/302; H01S 3/094003; H01S 3/1312; H01S 3/0014; H04B 10/2916; H04B 10/07955
See application file for complete search history.

(56) References Cited

U.S. PATENT DOCUMENTS 5,543,912 A 8/1996 Kada et al.
6,519,082 B2 2/2003 Ghera et al.
(Continued)

FOREIGN PATENT DOCUMENTS

CN 101162175 4/2008
EP 0903877 3/1999
(Continued)

OTHER PUBLICATIONS

Faralli, et al., "Bidirectional Higher Order Cascaded Raman Amplification Benefits for 10-GB/s WDM Unrepeated Transmission Systems," Journal of Lightwave Technology, 2005, vol. 23, No. 8.
(Continued)

*Primary Examiner* — Eric L Bolda
(74) *Attorney, Agent, or Firm* — Harness Dickey & Pierce P.L.C.

(57) ABSTRACT

A smart spool is configured to be optically coupled between a pumping light source and optical point-loss sources in an optical fiber transmission line. The smart spool comprises a probe signal transmitter that transmits an optical probe signal into the transmission line. An optical detector receives probe signals scattered in the transmission line. A loss-measuring device is coupled to the optical detector and operable to measure aggregate losses in the transmission line and report the aggregate losses to a network manager. The spool comprises a fiber of sufficient length to offset the aggregated losses to enable a distributed Raman amplifier to pump the transmission line. The smart spool prevents the distributed Raman amplifier from shutting down and allows the distributed Raman amplifier to achieve entitled gain by pumping the fiber in the spool.

25 Claims, 6 Drawing Sheets

Related U.S. Application Data continuation of application No. 15/403,558, filed on Jan. 11, 2017, now Pat. No. 9,793,679, which is a continuation-in-part of application No. 14/820,532, filed on Aug. 6, 2015, now Pat. No. 9,640,941.

(60) Provisional application No. 62/033,865, filed on Aug. 6, 2014.

(51) Int. Cl.
| | |
|---|---|
| *G02B 6/42* | (2006.01) |
| *H04B 10/079* | (2013.01) |
| *H04B 10/291* | (2013.01) |
| *H01S 3/094* | (2006.01) |
| *H01S 3/13* | (2006.01) |
| *H01S 3/00* | (2006.01) |

(52) U.S. Cl.
CPC .. *H01S 3/094003* (2013.01); *H01S 3/094046* (2013.01); *H01S 3/1305* (2013.01); *H01S 3/1306* (2013.01); *H01S 3/13013* (2019.08); *H01S 3/302* (2013.01); *H04B 10/0797* (2013.01); *H04B 10/07955* (2013.01); *H04B 10/2916* (2013.01)

(56) References Cited

U.S. PATENT DOCUMENTS

| | | | |
|---|---|---|---|
| 6,587,259 | B2 | 7/2003 | Islam et al. |
| 6,833,947 | B2 | 12/2004 | Cussat-Blanc et al. |
| 6,862,132 | B1 | 3/2005 | Casaccia et al. |
| 7,079,737 | B1 | 7/2006 | Korolev et al. |
| 7,116,470 | B2 | 10/2006 | Matinelli et al. |
| 7,330,302 | B2 | 2/2008 | Miyamoto |
| 8,073,327 | B2 | 12/2011 | Mayer et al. |
| 9,640,941 | B2 * | 5/2017 | Hochhalter .............. H01S 3/302 |
| 2002/0097482 | A1 | 7/2002 | Sasaoka et al. |
| 2007/0030558 | A1 | 2/2007 | Martinelli et al. |
| 2007/0103766 | A1 | 5/2007 | Irriedrich |
| 2010/0157416 | A1 | 6/2010 | Sugaya et al. |
| 2010/0284061 | A1 | 11/2010 | Nicholson |
| 2011/0141552 | A1 | 6/2011 | Ghera et al. |
| 2012/0013975 | A1 | 1/2012 | Onaka |
| 2013/0286468 | A1 | 10/2013 | Akasaka et al. |
| 2014/0055777 | A1 | 2/2014 | Archambault et al. |
| 2014/0077971 | A1 | 3/2014 | Archambault et al. |
| 2016/0043527 | A1 | 2/2016 | Hochhalter |

FOREIGN PATENT DOCUMENTS

| | | |
|---|---|---|
| EP | 2701248 | 4/2014 |
| JP | 2003145840 A | 5/2003 |
| JP | 20040861423 A | 3/2004 |
| JP | 2004240278 | 8/2004 |
| JP | 2004279557 A | 10/2004 |
| JP | 2006189465 A | 7/2006 |
| WO | WO-2004-019461 | 3/2004 |

OTHER PUBLICATIONS

Finisar White Paper: "Applications for Distributed Raman Amplification," © 2012 Finisar Corporation, 1389 Moffett Park Drive, Sunnyvale, CA 94089-1133, www.finisar.com.

Finisar White Paper: "Operational Issues in the Deployment of Raman Amplifiers," ©2012 Finisar Corporation, 1389 Moffett Park Drive, Sunnyvale, CA 94089-1133, www.finisar.com.

Poutrina, et al., "Timing jitter in dispersion-managed soliton systems with distributed, lumped, and hybrid amplification," Journal of Lightwave Technology; 2002, pp. 790-797, vol. 20, Issue: 5.

Kummerle; "Point-to-Point Loss in Link Systems: Model and Calculation Methods," IEEE Transactions on communication Technology, Year: 1971, pp. 261-267, vol. 19, Issue: 3.

Fukuchi, "Wideband and ultra-dense WDM transmission technologies toward over 10-Tb/s capacity," Optical Fiber Communication Conference and Exhibit, 2002, pp. 558-559.

Curri, et al., "Merit of Raman Pumping in Uniform and Uncompensated Links Supporting NyWDM Transmission," Journal of Lightwave Technology, 2016, pp. 554-565, vol. 34, Issue: 2.

Gunther, et al., "Driving cycle-based design optimization of interior permanent magnet synchronous motor drives for electric vehicle application," 2014 International Symposium on Power Electronics, Electrical Drives, Automation and Motion, 2014, pp. 25-30.

Yu, et al., "The fiber-Brillouin ring for low noise amplification, switching and channel selection," [1991 Proceedings] The Twenty-Third Southeastern Symposium on System Theory, 1991, pp. 152-156.

Kim, et al., "Effect of localized loss on distributed fiber Raman amplifiers," Optical Fiber Communication Conference and Exhibit, 2002, pp. 639-640.

Rukhlenko, et al., "Nonlinear Silicon Photonics: Analytical Tools," IEEE Journal of Selected Topics in Quantum Electronics, 2010, pp. 200-215, vol. 16, Issue: 1.

Soto, et al., "Impact of Loss Variations on Double-Ended Distributed Temperature Sensors Based on Raman Anti-Stokes Signal Only," Journal of Lightwave Technology, 2012, pp. 1215-1222, vol. 30, Issue: 8.

Liu, et al., "Networks Attack-Defense model based on the improved Lanchester equation," 2013 International Conference on Machine Learning and Cybernetics, 2013, pp. 1083-1086 vol. 03.

Karnaugh, "Loss of Point-to-Point Traffic in Three-Stage Circuit Switches," IBM Journal of Research and Development, Year: 1974, pp. 204-216, vol. 18, Issue 3.

Ehrhardt, et al., "Requirements on transmission fibre infrastructure suitable or high power amplifiers," 2012 14th International Conference on Transparent Optical Networks (ICTON), 2012, pp. 1-4.

Kabir, et al., "Design of an optimal placement algorithm for large scale Photovoltaic in sub-transmission networks," 2014 3rd International Conference on the Developments in Renewable Energy Technology (ICDRET), 2014, pp. 1-6.

Svitek, et al., "A SiGe active sub-harmonic receiver front-end for 5-6 GHz wireless applications," 2003 Topical Meeting on Silicon Monolithic Integrated Circuits in RF Systems, 2003. Digest of Papers. 2003, pp. 64-67.

Rothmaier, et al., "Design of Economic PCM Arrays with a Prescribed Grade of Service," IEEE Transactions on Communications, 1981, pp. 925-935, vol. 29, Issue 7.

Baras, et al., "Component based modeling for cross-layer analysis of 802.11 MAC and OLSR routing protocols in ad-hoc networks," MILCOM 2009—2009 IEEE Military Communications Conference, 2009, pp. 1-7.

Chamas, et al., "Analysis, Design, and X -Band Implementation of a Self-Biased Active Feedback G_{m} -Boosted Common-Gate CMOS LNA," IEEE Transactions on Microwave Theory and Technique, 2009, pp. 542-551, vol. 57, Issue 3 542-551.

Murray, et al., "Target tracking with explicit control of filter lag," Proceedings The Twenty-Ninth Southeastern Symposium on System Theory, 1997, pp. 81-85.

* cited by examiner

US 11,462,882 B2

DISTRIBUTED RAMAN AMPLIFIER SYSTEMS

CROSS REFERENCE TO RELATED APPLICATIONS

This application is a Continuation of U.S. patent application Ser. No. 15/581,342, filed Apr. 28, 2017, which is a Continuation of U.S. patent application Ser. No. 15/403,558, filed Jan. 11, 2017, now U.S. Pat. No. 9,793,679, which is a Continuation-in-Part of U.S. patent application Ser. No. 14/820,532, filed on Aug. 6, 2015, now U.S. Pat. No. 9,640,941, which claims the benefit of priority to U.S. Prov. Appl. No. 62/033,865, filed on Aug. 6, 2014. All of these patents and applications are incorporated by reference in their entirety.

FIELD OF THE INVENTION

The field of the invention is optical transmission technologies.

BACKGROUND

The background description includes information that may be useful in understanding the present invention. It is not an admission that any of the information provided herein is prior art or relevant to the presently claimed invention, or that any publication specifically or implicitly referenced is prior art.

Distributed Raman amplifiers provide for greater transmission distances through pumping optic fiber transmission lines. However, the power of the pumping laser can exceed the physical capability of the transmission line to support the pumping activity, thereby damaging the fiber or optical components. In order to prevent such damage, a distributed Raman amplifier sends a short duration probe pulse down the transmission line to detect by return signals if there are optical losses. If the optical losses are too severe, the distributed Raman amplifiers will shut down. If the optical losses are less severe or low, the distributed Raman amplifier will begin pumping the transmission line.

In some scenarios, multiple optical point-loss sources are proximate to a distributed Raman amplifier where the aggregated sources individually contribute to optical losses that are so significant that the distributed Raman amplifier shuts down. For example, multiple optical connectors disposed within a carrier hotel could contribute to aggregated optical losses that would cause the distributed Raman amplifier to fail to pump the transmission lines.

Interestingly, a major supplier of optical network infrastructure suggests, in such scenarios, an "alternative solution would be to 'homerun' fibers, which means bypassing some patch panels." Such an approach is not practical in carrier hotels and is not a cost effective solution.

U.S. patent application publication 2007/0030558 to Martinelli et al., titled, "Raman-Amplified Optical Transmission System and Method for Amplifying Optical Signals", filed Jun. 13, 2006, describes a scenario where a lumped Raman amplifier is coupled with a distributed Raman amplifier. The lumped Raman amplifier, disposed behind the distributed Raman amplifier, achieves localized gain, possibly via a spooled high-Raman efficiency amplification fiber. Although the Martinelli approach provides for additional gain via a spooled fiber, the Martinelli configuration would still fail in the carrier hotel environment as the aggregated losses would still cause the distributed Raman amplifier to shut down.

Thus there remains a signification need to offset optical losses in environment where optical point-loss sources are proximate to a distributed Raman amplifier.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The inventive subject matter provides apparatus, systems and methods in which a Raman amplifier system is able to overcome or offset debilitating optical losses on a transmission line while also retaining pumping efficiency and connectivity. One aspect of the inventive subject matter includes a distributed Raman amplifier system that includes a distributed Raman amplifier, a set of point-loss sources, and a spool of fiber. The distributed Raman amplifier is configured to detect if observed optical losses on a transmission line satisfy optical threshold criteria. If so, the Raman amplifier can pump the transmission line without damaging the transmission line. The set of optical point-loss sources (e.g., connectors, dirty fibers, equipment, etc.), possibly within a carrier hotel, in aggregate have aggregated losses that fail to satisfy the optical threshold criteria, which would ordinarily cause the distributed Raman amplifier to shut down. The spool of fiber is placed between the distributed Raman amplifier and the set of optical point-losses where the spool of fiber couples the Raman amplifier to the set of optical point-losses via an optic fiber. The optic fiber, due to the length of the fiber, offsets the aggregated losses by causing the distributed Raman amplifier to measure observed optical losses that do satisfy the optical threshold criteria, thereby allowing the distributed Raman amplifier to initiate pumping.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
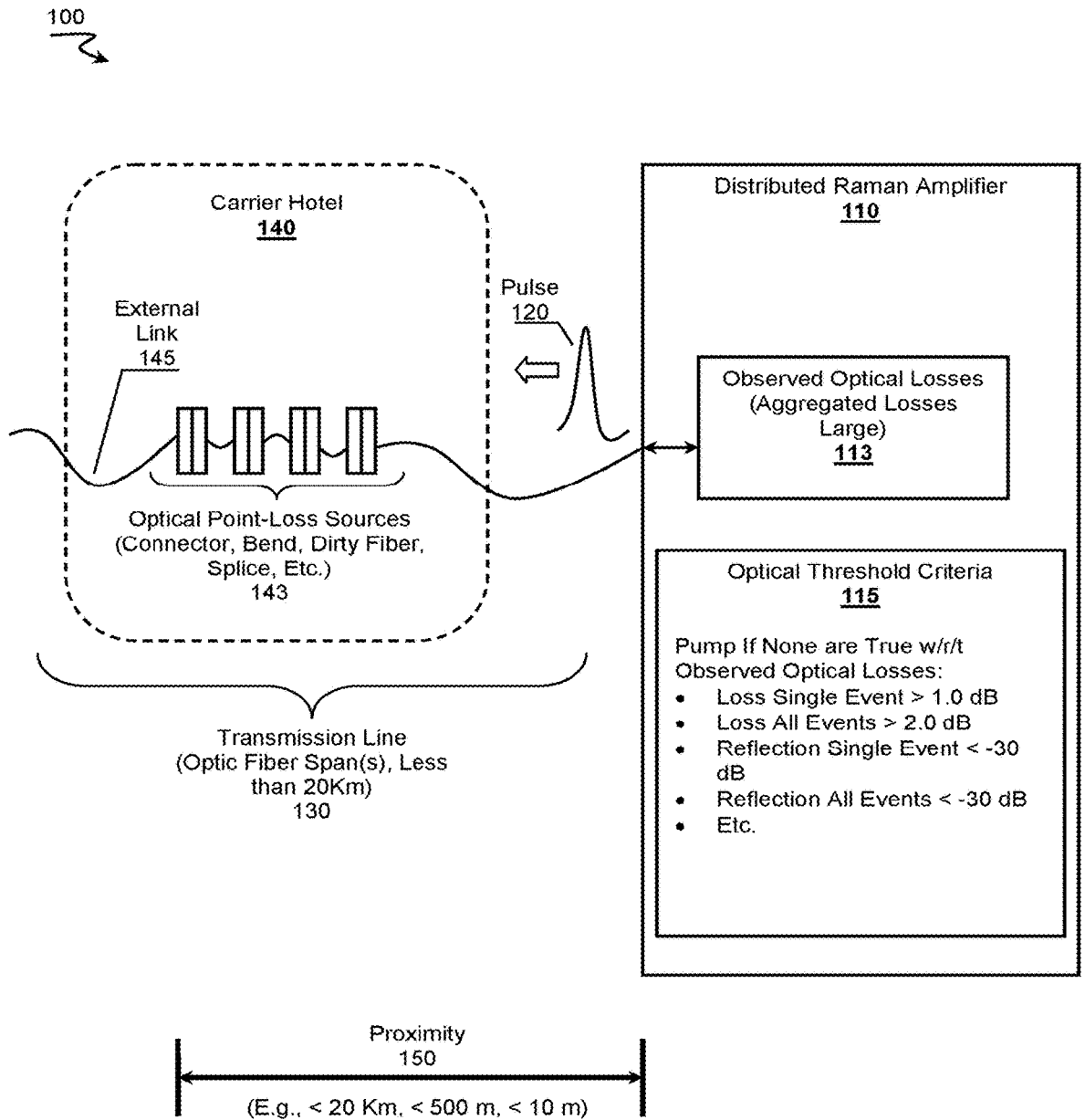
FIG. 1 is an overview of a distributed Raman system where a distributed Raman amplifier shuts down due to aggregated optical losses.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including configuring an optical fiber system that includes a distributed Raman amplifier to offset aggregated optical losses.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Typically long distance or long haul optic fiber networks use EDFA amplifiers to achieve distances of 2000 Km, especially in a carrier hotel environment. In order to support high bandwidth transmission over greater distances (e.g., 4000 Km), distributed Raman amplifiers are required. However, distributed Raman amplifiers can be quite sensitive to optical losses on transmission lines in a carrier hotel, which reduces the amplifier's utility. The disclosed inventive subject matter describes a system by which the sensitivity of the distributed Raman amplifiers can be offset.

FIG. 1 illustrates distributed Raman amplifier system 100 where distributed Raman amplifier 110 shuts down due to severe optical losses detected on transmission line 130. System 100 includes distributed Raman amplifier 110, and set of optical point-loss sources 143 perhaps disposed within carrier hotel 140. Distributed Raman amplifier 110 optically couples to the set of optical point-loss sources 143 via transmission line 130. It should be appreciated that the set of optical point-loss sources fall within physical proximity 150 of distributed Raman amplifier 110. For example, proximity 150 is typically less than 20 Km (e.g., within the pumping range of distributed Raman amplifier 110. More typically proximity 150 is less than 500 meters (e.g., within campus or building), or is even less than 10 meters (e.g., within the same room) as would be typical in environments having carrier hotel 140. External communication is achieved through external link 145, which can optically connect to a long-haul fiber network.

Distributed Raman amplifier 110 is configured to detect observed optical losses 113 of transmission line 130 via sending pulse 120 down transmission line 130. In response to pulse 120, distributed Raman amplifier 110 detects return signals, which are measured to generate observed optical losses 113. Distributed Raman amplifier 110 also includes optical threshold criteria 115. Optical threshold criteria 115 defines the conditions that should be met with respect to observed optical losses 113 in order for distributed Raman amplifier 110 to pump transmission line 110.

In the example shown, optical point-loss sources 143, in aggregate, cause aggregated losses such that observed optical losses 113 fail to satisfy optical threshold criteria 115. Example criterion within optical threshold criteria 115 could include the follow in order to pump transmission line 130:

A single loss event should not exceed 1.0 dB;
Loss from all events should not exceed 2.0 dB;
Reflections from a single event is greater than −30 dB; and
Reflections from all events (Optical Return Losses) is greater than −30 dB.

Optical threshold criteria 115 can be based on the fiber or the Raman amplifier manufacture specifications, or based on industry standards.

Optical threshold criteria 115 can include numerous criteria with respect to losses. For example, optical threshold criteria 115 could include a condition similar to the above that a single point-loss has loss of no greater than 2 dB, or more preferably, no greater than 1 dB. With respect to the example of FIG. 1, aggregated losses could include multiple point-losses that are collectively at least 2 dB, which could cause distributed Raman amplifier 110 to fail to pump transmission line 130.

Optical point-loss sources 143 could be disposed within one or more proximal carrier hotels 140 within 20 Km of digital Raman amplifier 110. Further, optical point-loss sources 143 could include a broad spectrum of conditions. Example point-loss sources could include optical connectors, dirty fiber, splices, bends, or other conditions. Each of these sources could individually contribute 0.2 dB, 0.5 dB, or more loss in gain. Thus, when there are a sufficient number of such optical point-loss sources 143, observed optical losses 113 could fail to satisfy optical threshold criteria 115. For example, there could be three, four, five, or even 10 or more point-loss sources along transmission line 130, that individually or collectively cause distributed Raman amplifier 110 to shut down.

Figure 2:
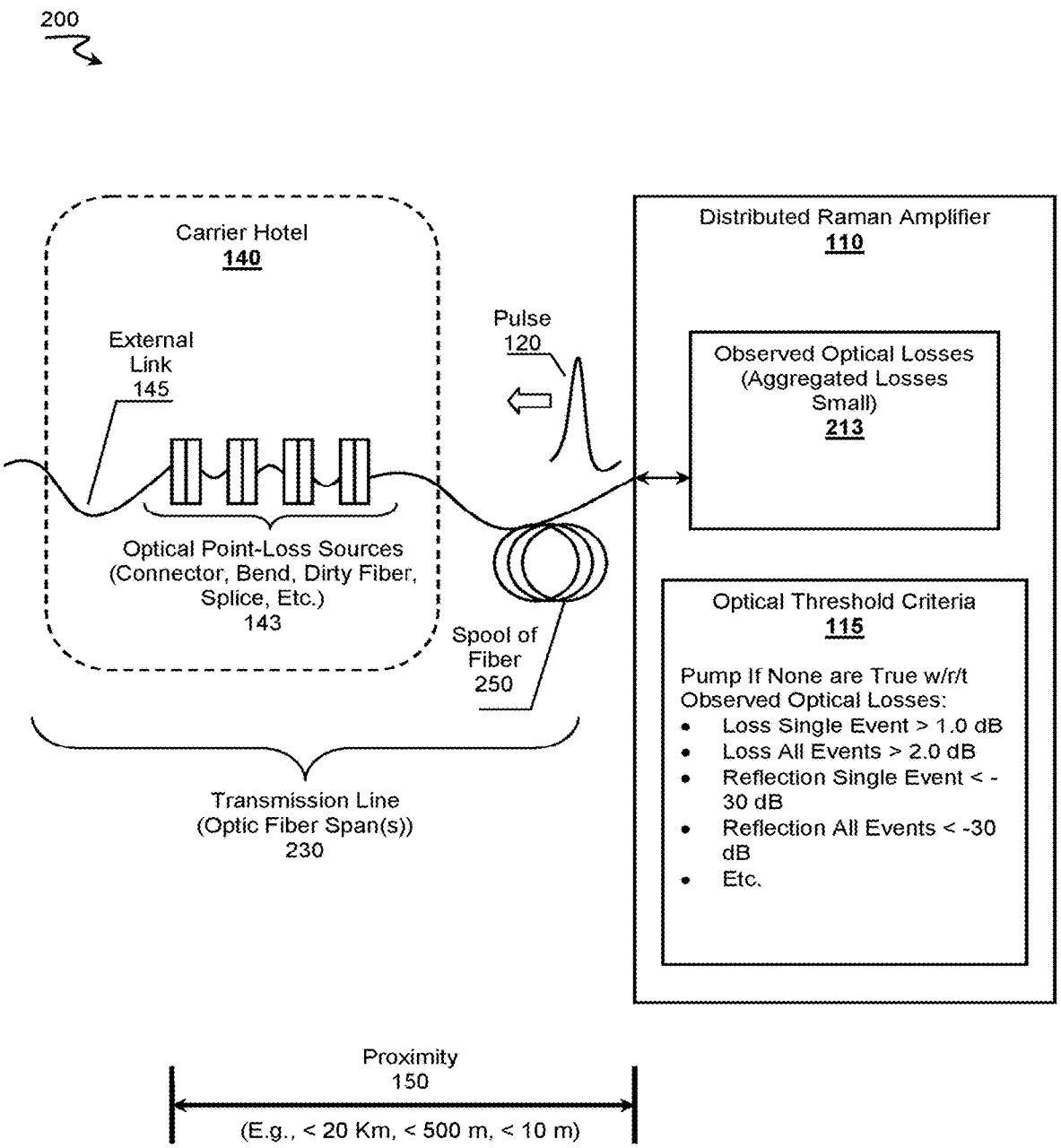
FIG. 2 is the distributed Raman system of FIG. 1 where the aggregated optical losses are offset by a spool of fiber to allow the distributed Raman amplifier to start up.

FIG. 2 presents a solution to the problematic environment of FIG. 1. FIG. 2 presents distributed Raman amplifier system 200, which exists in the same environment as FIG. 1 and introduces spool of fiber 250. Spool of fiber 250 is disposed between distributed Raman amplifier 110 and optical point-loss sources 143, and optically couples these two elements. Spool of fiber 250 further includes a fiber of sufficient fiber length to offset the aggregated losses arising from optical point-loss sources 143 with respect to pulse 120. In response to pulse 120 in the example shown, introduction of the fiber spool causes observed optical losses 213 observed by distributed Raman amplifier 110 to satisfy the optical threshold criteria 115.

In system 200, the length of fiber in spool of fiber 250 serves multiple purposes. First, it provides a gain media for distributed Raman amplifier 110 allowing distributed Raman amplifier 110 to pump incoming signals. Second, the length of the fiber ensures aggregate losses originating from optical point-loss sources 143 do not impact the distributed Raman amplifier 110. Thus, spool of fiber 250 offsets aggregate losses and thereby eliminates the need for "homerun" fibers and isolates the sensitivity of distributed Raman amplifier 110 from the dirty environment of carrier hotel 140. The term "spool" is used euphemistically to mean a length of fiber and should not be construed as requiring an actual spool. An acceptable spool of fiber could include those manufactured by Optilab®.

Spool of fiber 250 can comprise a fiber having a fiber length that is sufficient to offset the aggregate losses. Thus, for substantially lossy environments, the fiber length might be no more than 20 Km. Still, in other embodiments, depending on the nature of the optical losses, the fiber length might be no more than 15 Km, 10 Km, or for less lossy environment no more than 5 Km. Further in more preferred embodiments, spool of fiber 250 comprises a single spool, no-loss fiber so that it does not contribute to observed optical losses 213. Spool of fiber 250 can be further packaged (e.g., sized and dimensioned) to fit within a 1 U rack-mount module for deployment into carrier hotel 140 or other rack-based system.

In some embodiments, spool of fiber 250 could include a "smart spool" where the smart spool could probe optical point-loss sources 143 and report observed optical losses 213. For example, the smart spool itself can comprise its own Raman amplifier configured to send a pulse toward optical point-source losses 143. Once any optical losses are detected, the losses could be reported to a network manager, possibly via SNMP or other management protocol. The distributed Raman amplifier can then be optically decoupled from transmission line 230 to allow the spool fiber to couple to devices external to distributed Raman amplifier 110.

It should be appreciated that the disclosed system provides as close to 100% gain as permitted for a given configuration. This is achieved by offsetting the aggregated losses. Any point losses cause a significant decrease in Raman gain to the system, the greater the point-losses the greater the decrease in gain. In general, there is a 1:3+ ratio from point-losses to decreased gain, subject to varying conditions. For example, a 0.5 dB point loss (i.e. connector) would generally decrease Raman gain by 1.5 dB; a series of point losses of ~1 dB would decrease Raman gain by 3 dB and so forth. Therefore, with a clean spool directly in series with the Raman up to 100% of the gain is possible, minus of course the dB/km of the spool. Thus, it is desirable for the spool to have lowest dB/km as possible in this system; depending upon fiber type, manufacturer and date, spools can be had with various fiber type characteristics, potentially some as low as 0.20 dB/km (or lower). In such conditions the distributed Raman amplifier would see ~100% gain—minus ~4 dB of spool. Additionally the concern of deteriorating local point-loss conditions in the carrier hotel are removed, such that if a distributed Raman amplifier was used without a spool with aggregate point-losses just below the 2 dB mark, and if fiber was cut, unplugged, etc., and the point-losses deteriorated in any way, then the system would not restart itself due to the aggregate losses begin greater than the distributed Raman amplifier's maximum threshold. While the spool does add ~4 dB to the overall first span, if the remaining dB to the first amplifier is <20 dB, then the spool implementation becomes very advantageous.

Further, the disclosed approach is also applicable to other sensitive optical communication infrastructure. For example, Super Channels (See URL en.wikipedia.org/wiki/Super-channel), a type of dense wavelength division multiplexing (DWDM) can also be sensitive to local points-of-loss. Therefore, the disclosed approach of using a spool of fiber to offset such sensitivity is considered to be advantageous for Super Channels.

Figure 3:
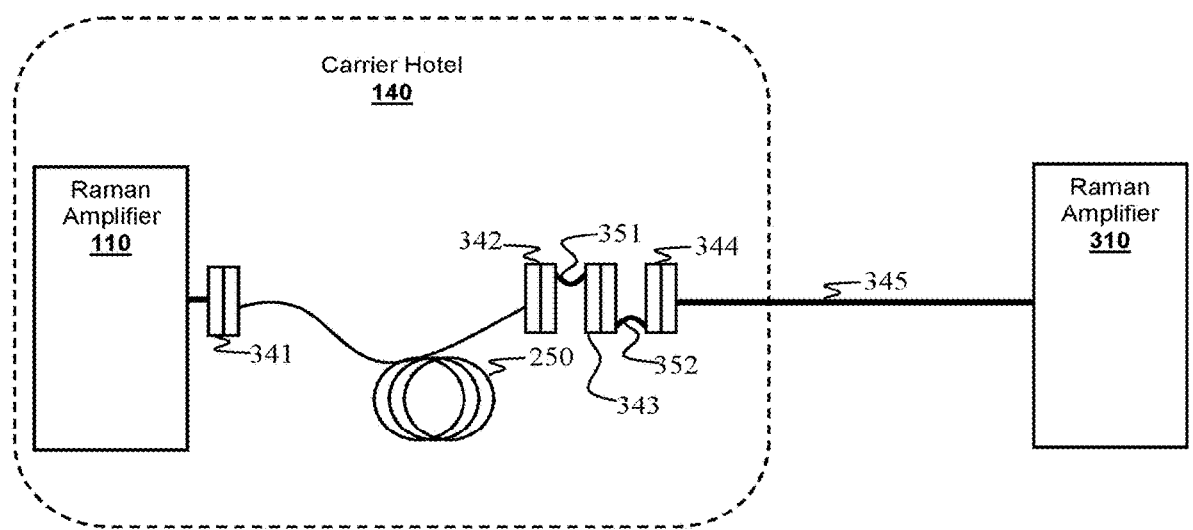
FIG. 3 is a block diagram of a distributed Raman system in accordance with an aspect of the invention.

FIG. 3 illustrates an aspect of the invention in which multiple optical point-loss sources are proximate to the distributed Raman amplifier (i.e., within the pumping range of the Raman amplifier 110). In a carrier hotel 140, there can be a series of jumpers and tie panels before the signal reaches the outside plant (OSP) fiber 345 (e.g., via the external link 145), any of which can cause poor optical return loss (ORL), a spiked event, or via the series of connectors, a large total event loss. For example, a series of connector panels 341-344 with jumpers (e.g., 351 and 352) are shown. However, by inserting a spool of fiber 250 (e.g., a 20 km spool) at the receiver port, the distributed Raman amplifier 110 receives a clean test signal at start up, and close to all the potential gain can occur, as there is virtually no loss due to cross connects, jumpers (e.g., 351 and 352), and splices.

In one aspect, the spool 250 is located in the carrier hotel 140 where it couples the distributed Raman amplifier 110 to the set of optical point-losses via an optic fiber. In some aspects, the spool of fiber 250 can be a rack-mounted spool, such as a 1 U rack-mount module for deployment in the carrier hotel 140 or other rack-based system.

Since the spool of fiber 250 does not need to be spliced, it can comprise a different type of fiber, such as one which suffers less loss. Thus, in one aspect, the spool of fiber 250 can comprise hollow core fiber. Other types of low-loss fiber can be employed.

In some aspects, the spool's 250 cladding type, core type, and/or cladding diameter can be selected to produce a greater Raman effect, which increases the OSNR and/or gain. Other fiber types that increase the Raman effect can be employed. By way of example, but without limitation, sloping (i.e., decreasing) the diameter of the cladding beginning at the transmission point can increase the Raman effect. In some aspects of the invention, only a portion of the spool 250 is adapted. In accordance with certain aspects, it can be advantageous to avoid introducing nonlinear effects, random imperfections, and asymmetries that affect chromatic and/or polarization dispersion.

Figure 4:
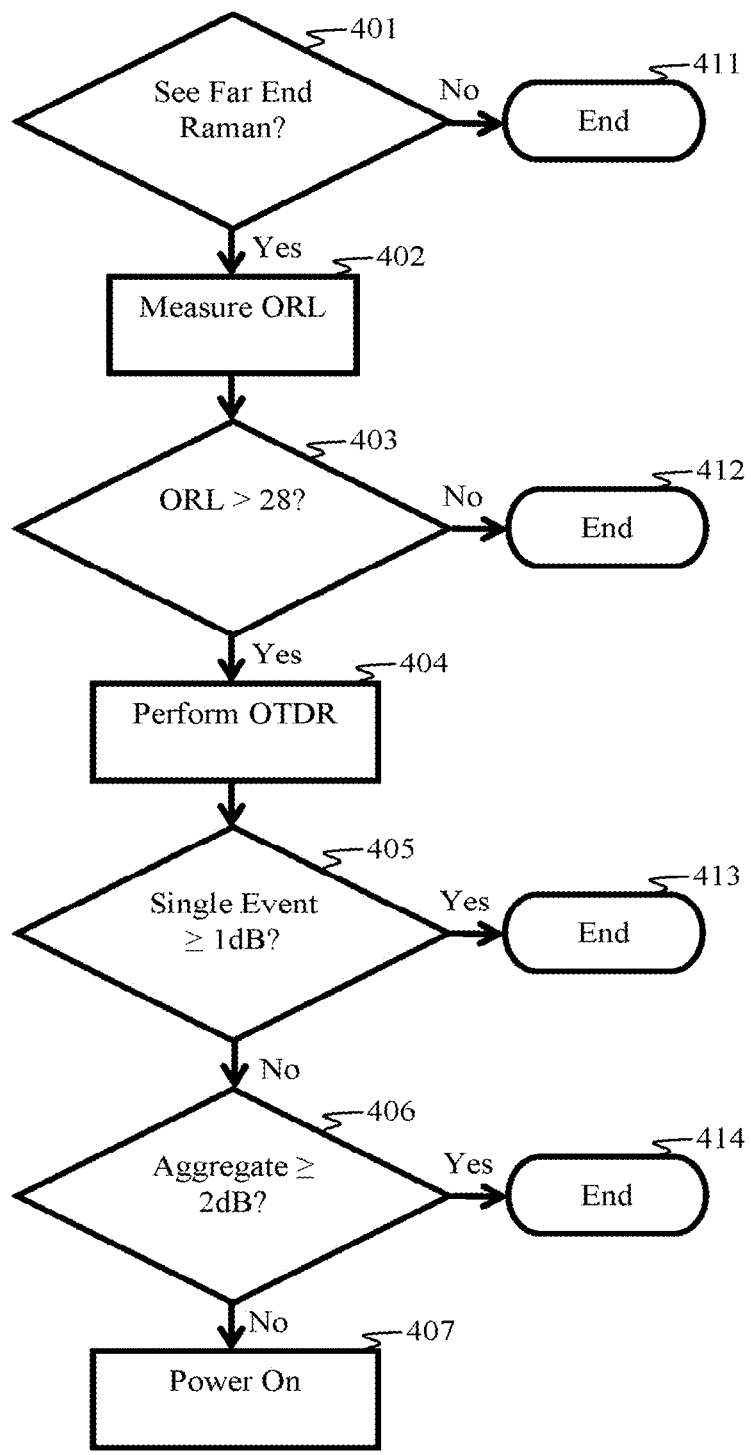
FIG. 4 is a flow diagram depicting a set of decision-making steps performed in accordance with some aspects of the invention.

FIG. 4 is a flow diagram of a set of decision-making steps to determine whether to allow a distributed Raman amplifier to pump a transmission line. A first step 401 comprises detecting the far end Raman amplifier 310 via an optical service channel. If the far end amplifier 310 is detected, control passes to the step 402. Otherwise, the process terminates 411.

At step 402, the optical return loss (ORL) is measured. Return loss is a measure of how well devices or lines are matched. A match is good if the return loss is high. A high return loss is desirable and results in a lower insertion loss. At step 403, if the ORL is above a predetermined value, control moves to process 404. Otherwise, the process terminates 412.

At step 404, Optical Time Domain Reflectometry (OTDR) is performed. The OTDR results are evaluated 405 for a single event that results in a loss greater than or equal to a threshold value (e.g., 1 dB), which terminates 413 the process. Otherwise, an aggregate of the events is compared 406 to a threshold value (e.g., 2 dB). If the threshold is exceeded, the process terminates 414. Otherwise, the distributed Raman amplifier is permitted to pump 407 the transmission line.

Figure 5:
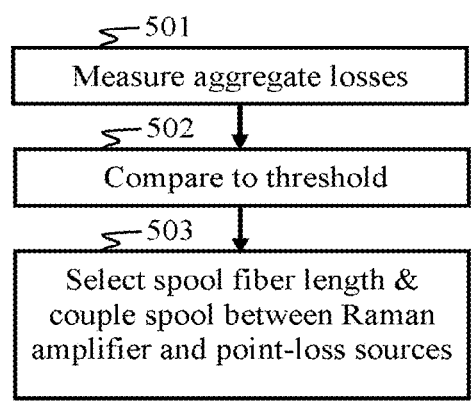
FIG. 5 is a flow diagram depicting a method of operating a distributed Raman amplifier system in accordance with some aspects of the invention.

FIG. 5 is a flow diagram for a method of operating a distributed Raman amplifier system. Aggregate losses are measured 501 and compared 502 to a threshold value, below which a distributed Raman amplifier is permitted to pump a transmission line. If the aggregate losses are above the threshold value, then a spool of fiber is optically coupled 503 between the distributed Raman amplifier and a set of optical point-loss sources.

The length of fiber in the spool is selected to provide at least a sufficient length to offset aggregated losses arising from the optical point-loss sources, and thereby enable the distributed Raman amplifier to pump the transmission line. Point losses cause a significant decrease in Raman gain, but the spool provides a gain media for the distributed Raman amplifier which can offset those losses. In some aspects, the threshold may stipulate a maximum value for a single point loss. In any of these cases, the length of fiber in the spool is selected to cause the observed optical losses observed by the distributed Raman amplifier to satisfy the optical threshold criteria.

Figure 6:
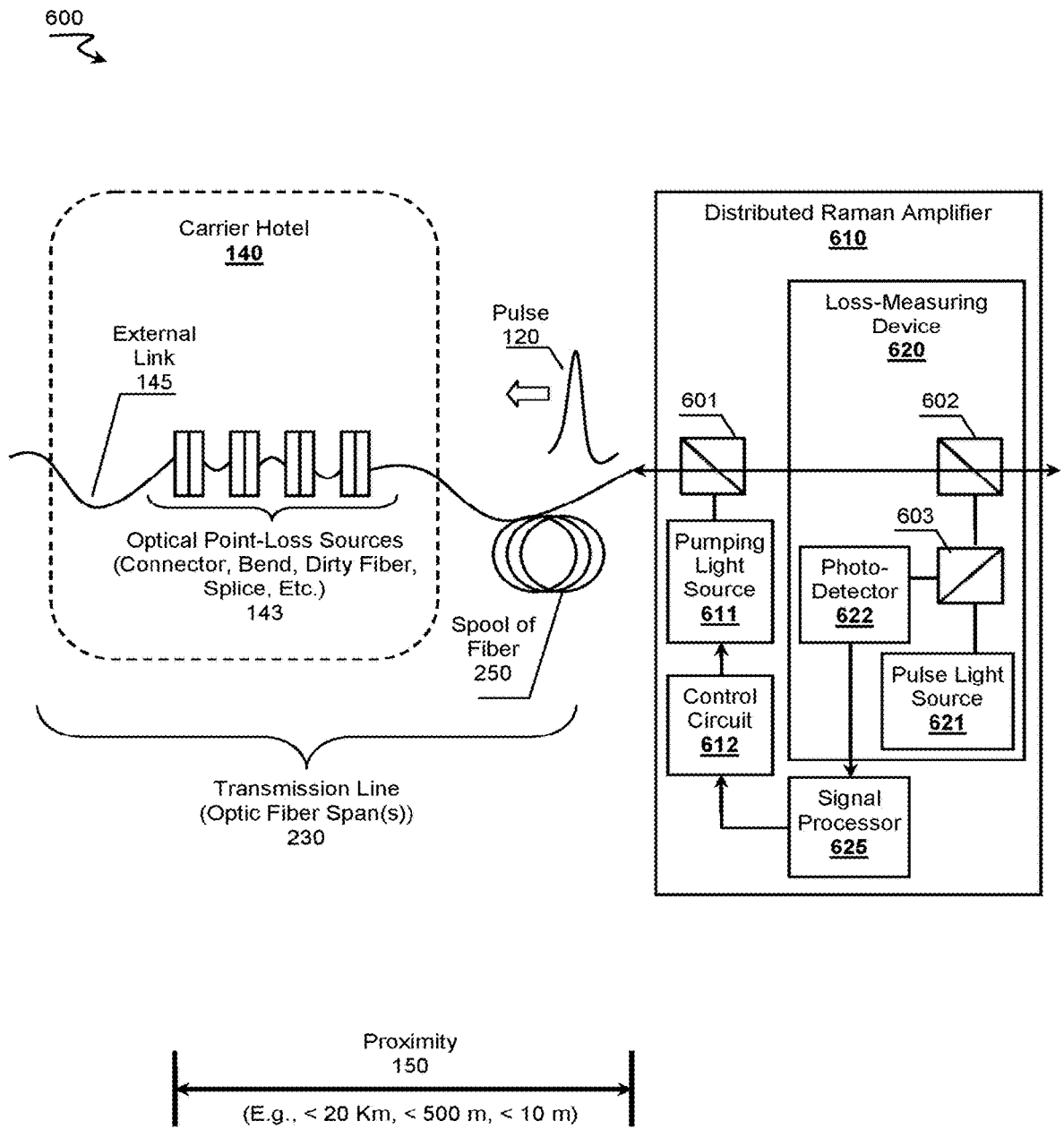
FIG. 6 is a block diagram of a distributed Raman system in accordance with an aspect of the invention.

FIG. 6 is a block diagram of a distributed Raman system 600 wherein aggregated optical losses are offset by a spool of fiber 250 to allow a distributed Raman amplifier 610 to start up. According to one configuration aspect, the Raman amplifier 610 supplies a pumping light generated by a pumping light source 611 to an optical amplification medium (via an optical coupler 601) to amplify a signal light. A control circuit 612, which may be separate from or integrated with the pumping light source 611, for example, governs the operation of the pumping light source 611.

The Raman amplifier 610 also comprises a loss-measuring device 620, which comprises a set of optical elements and may further comprise one or more electronic signal processing components. The loss-measuring device 620 is typically configured to input probing light (which is typically different from the signal light and the pumping light) to an optical fiber transmission line. Based on a reflected and/or backward scattered light of the probing light, the loss-measuring device 620 measures connecting losses due to one or more connecting points in the optical path, and the control circuit 612 controls the generation of the pumping light by the pumping light source 611 based on the measured losses.

As depicted in FIG. 6, the probing light can be generated by a pulse light source 621, and the probing light is coupled into the transmission line by an optical coupler 602. A light-receiving element, such as a photodetector 622 receives reflected/scattered light from the transmission line via optical couplers 602 and 603. The photodetector 622 can comprise an optical filter (not shown), which can separate the reflected/scattered light from other light in the transmission line (e.g., the signal light). The photodetector 622 converts received light to electrical signals, which can be measured and otherwise processed in a signal processor 625.

In one aspect, the signal processor 625 comprises a processing circuit configured to process electrical signals, such as to activate one or more switches and/or transmit one or more control signals to the control circuit 612. In another aspect, the signal processor 625 comprises a specific-purpose processor, such as an ASIC or any other suitable specific-purpose computation processor, configured to process measurements of signals received by the photodetector 622 and produce control signals. In another aspect, the signal processor 625 comprises a general-purpose processor that is programmatically configured via software instructions to process signal measurements produced by the photodetector 622 and generate control signals to effect the methods disclosed herein. In some aspects, the control signals generated by the signal processor 625 are processed by the control circuit 612 to control the operation of the pumping light source 611, such as by activating or deactivating the source 611. The control signal(s) generated by the signal processor 625 may provide for optically coupling the spool of fiber 250 between the pumping light source 611 and optical point-loss sources 143 in the transmission line when the aggregate losses are above a threshold, wherein the spool 250 comprises a fiber of sufficient length to offset the aggregated losses to allow the distributed Raman amplifier 610 to pump the transmission line. By way of example, a control signal generated by the signal processor 625 can comprise at least one of a signal that operates at least one optical switch to optically couple the spool 250 to the transmission line, and a signal that notifies a human operator that the aggregate losses exceed the Raman amplifier's 610 pumping threshold.

In accordance with one aspect of the disclosure, a method of operating the distributed Raman system 600 is described as follows. The pumping light source 611 generates pumping light capable of Raman amplifying signal light being propagated through the amplification medium of the optical fiber transmission line. A wavelength of the pumping light source 611 is set so as to correspond to the wavelength of the signal light. By way of example, but without limitation, the central wavelength of the pumping light can be set to 1450 nm, which is shifted by about 100 nm to a shorter wavelength relative to signal light at 1550 nm. However, the respective wavelengths of the signal light and the pumping light are not limited to the above.

The optical coupler 601 supplies the pumping light output from the pumping light source 611 towards the amplification fiber portion of the optical transmission line. The pumping light can be propagated in a direction opposite to the propagation direction of the signal light. The optical couplers 601 and 602 provide a pass-through of the amplified signal light in the Raman amplifier 610. The optical coupler 602 couples the transmitted probing light (e.g., optical pulse signal) from the pulse light source 621 into the transmission line toward the optical point loss sources 143 (e.g., in the opposite direction of the signal light in this case) and couples scattered/reflected probing light from the optical point loss sources 143 from the transmission line into an optical path inside the loss-measuring device 620 that leads to the photodetector 622. The optical coupler 601 provides a pass through for the transmitted probing light and the scattered/reflected probing light.

The optical coupler 603 provides a pass through for the transmitted probing light generated by the pulse light source 621 and couples received scattered/reflected probing light to the photodetector 622. Since other light (e.g., the signal light) might be directed through the coupler 603 toward the photodetector, a filter (not shown) can be employed in the loss-measuring device 620 to remove the other light. In some aspects, the wavelength of the probing light can be set to a different wavelength than the wavelengths of the signal light and the pumping light so as to enable distinction of the scattered/reflected probing light from the signal light and the pumping light.

The photodetector 622 receives the reflected/scattering probing light to photo-electrically convert it to produce an electrical signal level corresponding to the power of the reflected/scattering light. The signal processor 625 compares the electrical signal level to a pumping threshold, and depending on the result of the comparison, outputs a control signal to the control circuit 612, which controls the drive condition of the pumping light source 611. The control signal(s) generated by the signal processor 625 may provide for optically coupling the spool of fiber 250 between the pumping light source 611 and optical point-loss sources 143 in the transmission line, such as when losses are above a threshold. The spool 250 comprises a fiber of sufficient length to offset the losses to allow the distributed Raman amplifier 610 to pump the transmission line. By way of example, a control signal generated by the signal processor 625 can comprise at least one of a signal that operates at least one optical switch to optically couple the spool 250 to the transmission line, and a signal that notifies a human operator that the aggregate losses exceed the Raman amplifier's 610 pumping threshold.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A Raman amplifier system comprising:
    a Raman amplifier configured to detect observed optical losses of a transmission line via a pulse and to pump the transmission line when the observed optical losses satisfy optical threshold criteria; and
    a length of fiber coupled with the Raman amplifier, wherein the length of fiber is configured to offset aggregated losses from at least one optical point-loss source by causing the observed optical losses observed by the Raman amplifier to satisfy the optical threshold criteria.

2. The system of claim 1, wherein the optical threshold criteria includes a condition that the aggregated losses are no greater than 2 dB.

3. The system of claim 2, wherein the optical threshold criteria includes a condition that a single point-loss has a loss of no greater than 1 dB.

4. The system of claim 1, wherein the aggregated losses comprise multiple point-losses that are at least 2 dB.

5. The system of claim 1, further comprising a set of optical point-loss sources proximate to the Raman amplifier wherein, in aggregate, the set of optical point-loss sources comprise the aggregated losses and wherein the aggregated losses fail to satisfy the optical threshold criteria.

6. The system of claim 5, wherein at least some optical point-loss sources in the set of optical point-loss sources contribute individually no greater than 1 dB to the aggregated losses.

7. The system of claim 6, wherein at least some of the optical point-loss sources in the set of optical point-loss sources contribute individually at least 0.5 dB to the aggregated losses.

8. The system of claim 5, wherein no more than one optical point-loss source in the set of optical point-loss sources contributes more than 1 dB to the aggregated losses.

9. The system of claim 5, wherein the set of optical point-loss sources comprises at least three optical point-loss sources.

10. The system of claim 5, wherein the set of optical point-loss sources comprises at least one of an optical connector, a dirty fiber, a splice, and a bend.

11. The system of claim 5, wherein the set of optical point-loss sources are within 500 meters of the Raman amplifier.

12. The system of claim 5, wherein the set of optical point-loss sources are within 10 meters of the Raman amplifier.

13. The system of claim 5, further comprising a carrier hotel that comprises the set of optical point-loss sources.

14. The system of claim 5, wherein the length of fiber is configured to detect point-loss events from the set of optical point-loss sources.

15. The system of claim 14, wherein the length of fiber further comprises a communication port configured to transmit loss information relating to the point-loss events to an external device.

16. The system of claim 1, wherein the length of fiber is less than or equal to a pumping range of the Raman amplifier.

17. The system of claim 1, wherein the length of fiber is sized and dimensioned to fit within a 1 U rack-mount module.

18. The system of claim 1, wherein the length of fiber comprises at least one of a single spool, no point-loss fiber; a Raman amplifier; a fiber configured to enhance its Raman effect; and a smart spool.

19. The system of claim 1, wherein the transmission line comprises at least two sections of optic fiber.

20. The system of claim 1, wherein the aggregated losses comprise point losses that include at least one of the following types: a single event loss, a point-loss, a summary point-loss within 20 Km, and an optical return loss.

21. A method of operating a Raman amplifier system, comprising:
    measuring aggregate losses in the Raman amplifier system;
    comparing the aggregate losses to a threshold below which a Raman amplifier is permitted to pump a transmission line; and
    if the aggregate losses are above the threshold, employing a length of fiber to couple the Raman amplifier to at least one optical point-loss source, wherein employing the length of fiber comprises configuring the length of fiber to offset the aggregated losses, arising from the at least one optical point-loss source, for enabling the Raman amplifier to pump the transmission line.

22. The method of claim 21, further comprising configuring the length of fiber to fit within a rack-mount module.

23. The method of claim 21, further comprising configuring the length of fiber to probe and report observed optical point losses.

24. The method of claim 21, wherein the length of fiber comprises at least one of a low-loss fiber, a fiber adapted to increase its Raman effect, and a smart spool.

25. A computer-readable non-transitory storage medium carrying one or more sequences of one or more instructions which, when executed by one or more processors, cause an apparatus to at least:
    measure aggregate losses in a Raman amplifier system;
    compare the aggregate losses to a threshold below which a Raman amplifier is permitted to pump a transmission line; and
    if the aggregate losses are above the threshold, employ a length of fiber to couple the Raman amplifier to at least one optical point-loss source, wherein employing the length of fiber comprises configuring the length of fiber to offset the aggregated losses, arising from the at least one optical point-loss source, for enabling the Raman amplifier to pump the transmission line.

* * * * *